A. A. OSBORN.
Clutch for Shaft-Coupling.
No. 196,822. Patented Nov. 6, 1877.
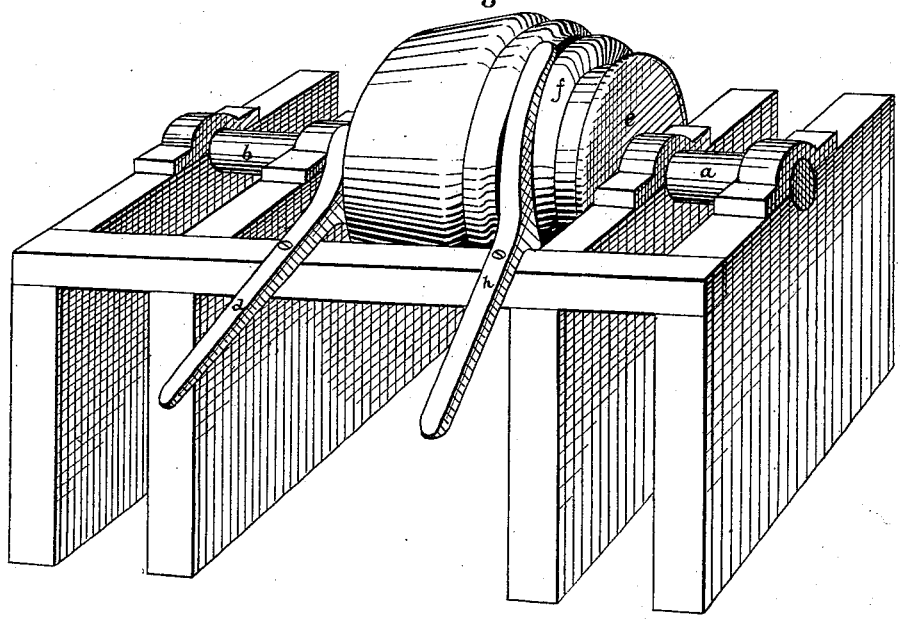
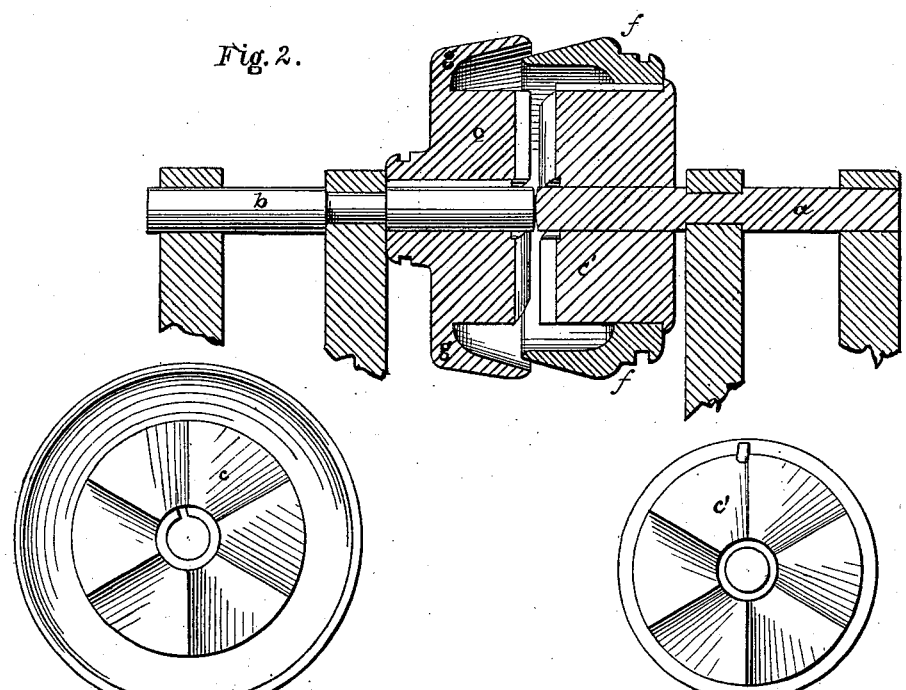
Witnesses
Geo. H. Strong
Jno. L. Boone
Inventor
Ambrose A. Osborn
by
Dewey & Co.
attys

UNITED STATES PATENT OFFICE.

AMBROSE A. OSBORN, OF SAN FRANCISCO, CALIFORNIA.

IMPROVEMENT IN CLUTCHES FOR SHAFT-COUPLINGS.

Specification forming part of Letters Patent No. 196,822, dated November 6, 1877; application filed July 9, 1877.

*To all whom it may concern:*

Be it known that I, AMBROSE A. OSBORN, of the city and county of San Francisco, and State of California, have invented an Improved Shaft-Coupling; and I do hereby declare the following to be a full, clear, and exact description thereof, reference being had to the accompanying drawings.

My invention relates to a novel construction for shaft-couplings, by which I am enabled to connect shafts running at any rate of speed without clash or jar, and at the same time in a perfectly secure manner. This I effect by combining a friction with a clutch coupling, in such a manner that the part of the shaft to be connected is put into motion by the friction device, and the positive clutch can afterward be easily locked, all as hereinafter fully described.

In the accompanying drawings, Figure 1 is a perspective view of my device. Fig. 2 is a sectional elevation.

$a$ is a shaft, driven by any power; and $b$ is another shaft, which stands in a line with the first shaft. These shafts are provided with a clutch or rigid coupling device, as shown at $c\ c'$, and the clutch $c$ is operated by a lever, $d$, as shown. The difficulty in using this class of rigid couplings, especially in fast-running shafts, is found in overcoming the inertia of the stationary shaft without a disagreeable jar or danger of breaking the parts. In order to remedy this I employ, in combination with the clutch or rigid coupling, a friction-coupling, which operates as follows: The fixed clutch $c'$ is secured to the driving-shaft $a$, and the conical portion $f$ of the friction-coupling slides back and forward upon this clutch, to which it is united by a feather, as shown, so that the two rotate together. The cup or inclosing portion $g$ of the friction-coupling forms a part of the clutch $c$.

It will be seen that when it is necessary to couple the shafts together the parts $f$ and $g$ of the friction-coupling are first brought together by means of the lever $h$, which forces the cone into the cup, and motion is thus gradually imparted to the shaft $b$ until it is moving at the same rate of speed as the shaft $a$. The clutch or coupling $c\ c'$ is then thrown into contact by means of the lever $d$, when the shafts are as rigidly connected as if they were one.

This device is valuable for many kinds of machinery, such as saw-mills, and in any place where a considerable power is to be transmitted which could not be surely or economically done by a friction-coupling alone, and where it would not do to make the connection suddenly, as with the rigid coupling.

The different parts herein described, or equivalent devices, may be used, and either portion may be connected with either shaft $a$ or $b$.

I do not confine myself to any particular form of clutch or friction coupling; but,

Having thus described my invention, what I claim, and desire to secure by Letters Patent, is—

The combination, with shafts $a$ and $b$, of the movable parts $c\ g$ of the coupling, and the stationary portion $c'$, having the movable portion $f$, with their operating-levers, the several parts constructed and relatively arranged as herein shown and described.

In witness whereof I have hereunto set my hand and seal.

AMBROSE A. OSBORN. [L. S.]

Witnesses:
C. F. BARRETT,
DE WITT C. ALLEN.